United States Patent
Montaner Gutierrez et al.

(10) Patent No.: US 8,340,040 B2
(45) Date of Patent: Dec. 25, 2012

(54) SYSTEM AND METHOD FOR PROVIDING MOBILE BASED SERVICES FOR HOTEL PBX

(75) Inventors: Javier Montaner Gutierrez, Madrid (ES); Isaías Espada Bermejo, Madrid (ES); Susana Escobar Gómez, Madrid (ES); Laura Fernández del Valle, Madrid (ES); José Arcadio Sánchez Santiago, Madrid (ES); Juan Ignacio Pastor Romero, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 381 days.

(21) Appl. No.: 12/794,979

(22) Filed: Jun. 7, 2010

(65) Prior Publication Data

US 2010/0329443 A1      Dec. 30, 2010

(30) Foreign Application Priority Data

Jun. 5, 2009  (ES) .................................. 200930271

(51) Int. Cl.
*H04L 12/56* (2006.01)
*H04J 1/16* (2006.01)
(52) U.S. Cl. ......................... 370/329; 370/252; 370/386

(58) Field of Classification Search .................. 370/252, 370/329, 386
See application file for complete search history.

(56) References Cited

U.S. PATENT DOCUMENTS

2012/0202474 A1*   8/2012   Gisby et al. .................. 455/417

* cited by examiner

*Primary Examiner* — John Pezzlo
(74) *Attorney, Agent, or Firm* — B. Aaron Schulman, Esq.; Stites & Harbison PLLC

(57) ABSTRACT

The invention relates to a method and system for providing mobile based services for hotel PBX having an external number assigned which includes the steps of providing each hotel room which provides the mobile based service with at least one mobile station comprising a SIM, each SIM storing a different IMSI number; assigning a VPN to the hotel; assigning each IMSI number of each mobile station to a different MSISDN that can only be used internally in the MNO network and that cannot be dialed from other telephones; and assigning each MSISDN to a different extension number that can be used as a room extension number and that corresponds to the VPN number of the VPN of the hotel. The invention is advantageous in that it solves problems of prior art systems by making use of a mobile PBX, so that every hotel will have its own VPN numbers that can be used as room extensions.

15 Claims, 2 Drawing Sheets

SYSTEM AND METHOD FOR PROVIDING MOBILE BASED SERVICES FOR HOTEL PBX

FIELD OF THE INVENTION

The present invention is comprised within the field of mobile telecommunications, and more specifically in the field of mobile based services for hotel PBX (Private Branch Exchange).

BACKGROUND OF THE INVENTION

The current PBX (Private Branch Exchange) services in hotels are minimally used by customers due to:
Expensive call rates.
Clients use their mobile phone (cheaper and more convenient).
For business customers, price is not so important but ease of use and convenience is the most important feature.
For personal users, price becomes much more important although convenience still plays a key role.
The proposed solution addresses the two points highlighted above and supports a commercial proposition that generates more revenue for the hotels while it offers more services to the hotel clients at a cheaper price.
Current PBX are based on fixed technology and there is a fixed telephone at every hotel room. Call rates could be lowered, but convenience cannot be improved. The user must be in the room to receive/make calls.
PBX solutions that support mobile handsets are available in the market and a VPN can be created between the mobiles of multiple users. However, the current solutions require a real mobile phone number (MSISDN) assigned to every terminal/extension. This means an overhead for the hotel.
The present invention solves those problems by making use of a mobile PBX, so that every hotel will have its own VPN numbers that can be used as room extensions.
It is well-known that abbreviations and acronyms are frequently used in the mobile telephony field. Below is a glossary of acronyms/terms used throughout the present specification:
DTMF Dual Tone Multi-Frequency
HLR Home Location Register
IMS IP Multimedia Subsystem
IMSI International Mobile Subscriber Identity
IN Intelligent Network
IVR Interactive Voice Response
MNO Mobile Network Operator
MO Mobile Originated
MS Mobile Station
MSC Mobile Switching Centre
MSISDN Mobile Station International Subscriber Directory Number
MSS MSC Server
MT Mobile Terminated
PBX Private Branch Exchange
SCP Service Control Point
SDP Service Data Point
SMS Short Message Service
VPN Virtual Private Network

DESCRIPTION OF THE INVENTION

The invention relates to a method for providing mobile based services for hotel PBX according to claim 1, and to a system according to claim 8. Preferred embodiments of the system and of the method are defined in the dependent claims.

In the present method the hotel PBX has an external number assigned. The method comprises:
providing each hotel room which provides the mobile based service with at least one mobile station comprising a SIM, each SIM storing a different IMSI number;
assigning a VPN to the hotel;
assigning each IMSI number of each mobile station to a different MSISDN that can only be used internally in the MNO network and that cannot be dialed from other telephones;
assigning each MSISDN to a different extension number that can be used as a room extension number and that corresponds to the VPN number of the VPN of the hotel;
for each call originated from a calling mobile station of the hotel:
checking if the call is aimed to a called party belonging to the hotel VPN, and in that case replacing the calling party number with the extension number assigned to the calling mobile station;
if the call is aimed to a called party not belonging to the hotel VPN, replacing the calling party number with the external number of the hotel PBX;
for each mobile terminated call aimed to a called mobile station of the hotel:
obtaining the extension number corresponding to the called mobile station of the hotel;
obtaining the MSISDN associated to said extension number;
redirect the call through the mobile operator network to said MSISDN of the called mobile station.

The method can further comprise, for each call originated from a calling mobile station of the hotel, obtaining the current location of the calling mobile station and, depending of said location, allowing or not the call.

The method also may comprise defining a Mobile Originated IN service associated to each MSISDN assigned to the IMSI number of each mobile station; and, for each call originated from a calling mobile station of the hotel, the following steps:
obtaining the IMSI number of the calling mobile station;
obtaining the MSISDN of the calling mobile station;
obtaining the destination number of the call;
checking if the MSISDN of the calling mobile station has a Mobile Originated IN service, and in that case:
checking if said MSISDN belongs to a hotel VPN and in that case:
obtaining the extension number assigned to the calling mobile station and the hotel VPN;
checking if the destination number of said call belongs to the same hotel VPN, and in that case:
replacing the calling party number with the extension number assigned to the calling mobile station,
obtaining the MSISDN associated to the destination number,
replacing the destination number with said obtained MSISDN, and
if the call is allowed, establishing the call;
in case the destination number corresponds to a MSISDN not belonging to the same hotel VPN:
replacing the calling party number with the external number of the hotel VPN, and
if the call is allowed, establishing the call.

The extension number corresponding to the called mobile station of the hotel can be obtained by means of an automatic IVR system or through a human operator that types it manually in the hotel PBX frontend.

The method can comprise, for each mobile terminated call aimed to a called mobile station of the hotel, obtaining the current location of the called mobile station and, depending of said location, allowing or not the reception of the call. In this case, the method can further comprise defining a Mobile Terminated IN service associated to each MSISDN assigned to the IMSI number of each mobile station and, for each mobile terminated call aimed to a called mobile station of the hotel, the following steps:

- detecting a Mobile Terminated IN service defined for the IMSI number of the called mobile station;
- retrieving the hotel VPN associated to the IMSI number of the called mobile station;
- retrieving the allowed locations from which a called mobile station associated to the hotel VPN can receive calls;
- retrieving the current location of the called mobile station;
- checking if the current location is included in the allowed locations, and in that case allowing the reception of the call.

The step of obtaining, for each mobile terminated call aimed to a called mobile station of the hotel, the MSISDN associated to the extension number corresponding to said called mobile station can be carried out by any of the following means:

- consulting an internal table of the hotel PBX;
- consulting the corresponding SDP.

On the other hand, the invention also comprises a system for providing mobile based services for hotel PBX, the hotel PBX having an external number (MainNum$_H$) assigned. The system comprises:

- at least one mobile station assigned to each hotel room providing the mobile based service, each mobile station comprising a SIM storing a different IMSI number;
- a HLR of the MNO providing the mobile based service for said hotel, the HLR configured to:
  - assign a VPN to the hotel, each VPN number of said VPN corresponding to an extension number assigned to each mobile station;
  - assign each IMSI number of each mobile station to a different MSISDN, extension number and to a different VPN number of the hotel;
  - define a Mobile Originated IN service associated to each MSISDN assigned to the IMSI number of each mobile station, the Mobile Originated IN service being configured to, for each call originated from a calling mobile station of the hotel:
    - check if the call is aimed to a called party belonging to the hotel VPN, and in that case replace the calling party number with the extension number assigned to the calling mobile station;
    - if the call is aimed to a called party not belonging to the hotel VPN, replace the calling party number with the external number of the hotel PBX;
- a hotel PBX system connected to the MNO and configured to, for each mobile terminated call aimed to a called mobile station of the hotel:
  - obtain the extension number corresponding to the called mobile station of the hotel;
  - obtain the MSISDN associated to said extension number;
  - redirect the call through the mobile operator network to said MSISDN of the called mobile station.

The system preferably comprises:

- at least one MSS of the MNO providing the mobile based service for said hotel, the MSS configured to, for each call originated from a calling mobile station of the hotel:
  - obtain the IMSI number of the calling mobile station;
  - obtain the MSISDN of the calling mobile station;
  - obtain the destination number of the call;
  - check if the MSISDN of the calling mobile station has a Mobile Originated IN service, and in that case send to a SCP the MSISDN of the calling mobile station and the destination number of the call;
- at least one SCP and at least one SDP, being configured to:
  - receive the MSISDN of the calling mobile station and the destination number of the call provided by the MSS;
  - check if said MSISDN belongs to a hotel VPN and in that case:
    - obtain the extension number assigned to the calling mobile station and the hotel VPN;
    - check if the destination number of said call belongs to the same hotel VPN, and in that case:
      - replace the calling party number with the extension number assigned to the calling mobile station,
      - obtain the MSISDN associated to the destination number,
      - replace the destination number with said obtained MSISDN;
    - in case the destination number corresponds to a MSISDN not belonging to the same hotel VPN:
      - replace the calling party number with the external number of the hotel VPN.

The at least one SCP and at least one SDP can be further configured to, for each call originated from a calling mobile station of the hotel, obtain the current location of the calling mobile station and, depending of said location, allowing or not the call.

The HLR can be configured to define a Mobile Terminated IN service associated to each MSISDN assigned to the IMSI number of each mobile station. The at least one SCP and the at least one SDP can be in that case further configured to, for each mobile terminated call aimed to a called mobile station of the hotel, obtain the current location of the called mobile station and, depending of said location, allowing or not the reception of the call.

The at least one SCP can be further configured to, for each mobile terminated call aimed to a called mobile station of the hotel:

- retrieve from the SDP the hotel VPN associated to the IMSI number of the called mobile station;
- retrieve from the SDP the allowed locations from which a called mobile station associated to the hotel VPN can receive calls;
- retrieve the current location of the called mobile station;
- check if the current location is included in the allowed locations, and in that case allow the reception of the call.

The hotel PBX system can comprise an automatic IVR system configured to, for each mobile terminated call aimed to a called mobile station of the hotel, obtain the extension number corresponding to said called mobile station.

In the system at least one hotel room which provides the mobile based service can have a plurality of mobile stations The hotel PBX system can be in this case configured such that the plurality of mobile stations sharing a room can receive incoming calls simultaneously, or such that one of the plurality of mobile stations sharing a room is selected as the main terminal for receiving calls and if the call is not answered by this main terminal said call is redirected to other mobile station sharing the room.

BRIEF DESCRIPTION OF THE DRAWINGS

A series of drawings which aid in better understanding the invention and which are expressly related with an embodiment of said invention, presented as a non-limiting example thereof, are very briefly described below.

DESCRIPTION OF A PREFERRED EMBODIMENT OF THE INVENTION

The present invention proposes the use of a mobile PBX. Every hotel will have its own VPN numbers. However, each extension will have assigned not a real MSISDN, but a SIM with real IMSI number that will be mapped in the MNO network to the corresponding extension of the hotel (in fact, to the corresponding short number of the hotel VPN).

In the present solution the clients of the hotel will have in their hotel rooms a mobile phone instead of a fixed phone. The users will be able to leave the room and the hotel with the hotel's mobile terminal and still be able to receive/make calls and SMS from any location. This way the hotel is providing (and charging) a 24 h service to its customers even when they are outside its premises.

Outgoing calls: If the call is going outside the hotel's VPN, the calling party number will be changed by the MNO (through Intelligent Network or IMS) to the hotel's PBX external number (one MSISDN for the whole hotel). If the call stays inside the hotel's VPN (i.e. the client is calling to the extension of another room), the MNO will change the calling party number to the short number/extension of the room of the calling customer.

The same mechanism can be implemented for originating SMS.

Incoming calls: The calls will be received at the PBX external number. An IVR mechanism with DTMF detection can be used to request the desired extension/short number. The MNO will be able to forward the call to the mobile of the requested customer.

Additionally a receptionist could also pick up the phone when an incoming call rings and request the desired extension/room number/customer name. The receptionist can introduce the requested extension in the PBX console to forward the call through the MNO to the mobile of the called customer (in fact, to its short number).

A possible improvement could be done: assigning multiple extensions to the same room (e.g. room 1451 may have two short codes assigned to it 14510 and 14511 when two clients share a room. The MNO can easily implement the "forking" mechanism so that incoming calls can be received at both extensions simultaneously. This "forking" mechanism is a well known standard solution implemented in IN and IMS networks where an originated call is split into two concurrent calls. When the network detects that one of the calls is successful, the second call is dropped and the communication continues normally through the first one. Both clients could talk among themselves by using their short number even when they are in different parts of the hotel/city/country.

Related to call rates, since the mobile operator is controlling all the calls, the MNO can offer preferential rates to the hotel so that its customers can also benefit from them and can make cheaper calls with the hotel's mobile extension than with their own mobile phone. This is especially true for international clients who pay expensive roaming rates when they use their home mobile handset.

Mobile Originated (MO) Call

Figure 1:
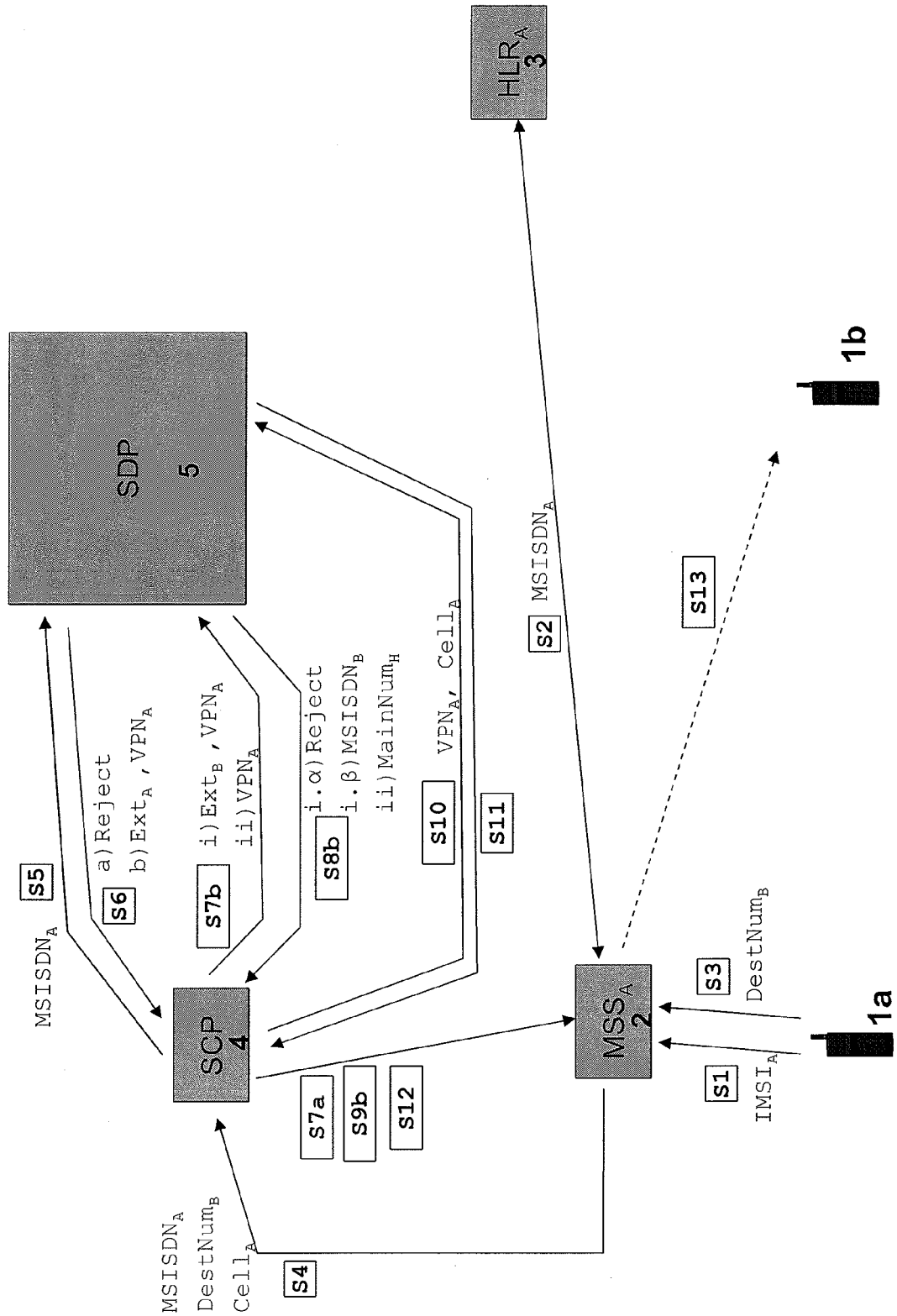
FIG. 1 shows a procedure for a mobile originated call belonging to the hotel, according to a preferred embodiment.

The procedure for a call originated from a mobile station 1a of the hotel, according to a preferred embodiment, has the following steps (S1,S2, . . . ), as shown in FIG. 1.

S1. The mobile station 1a is switched on and starts the IMSI Attach mechanism with the MSS 2 (3G, also know as MSC in 2G). The IMSI of the mobile station 1a, $IMSI_A$, is passed to the MSS 2.

S2. The MSS 2 contacts the HLR 3 and after some standard interactions among the mobile station 1a, the MSS 2 and the HLR 3, the MSS 2 receives the MSISDN associated to $IMSI_A$, $MSISDN_A$. The HLR 3 also informs the MSS 2 that $IMSI_A$ has one IN service associated to originating calls. Note that MSISDN is a special long dialling number used only internally in the operator network for signalling purposes. This number cannot be dialled from a telephone.

S3. At a later step, when the mobile station 1a sets up a call, it informs the MSS 2 of the destination number $DestNum_B$.

S4. MSS 2 sees that the calling party, $IMSI_A/MSISDN_A$, has one IN service defined and passes the call request to the SCP 4. This message includes $MSISDN_A$, destination number $DestNum_B$ and the current cell/location, $Cell_A$, where calling mobile station 1a is camping now.

S5. The SCP 4 checks with the SDP 5 if $MSISDN_A$ is associated to one hotel mobile network (a type of VPN).

S6. The SDP 5 processes the request:
  a) If $MSISDN_A$ is not associated to any VPN, SDP 5 informs the SCP 4 that will then reject the call (the number is not activated in the system).
  b) If $MSISDN_A$ is defined in SDP 5 and is associated to one VPN, SDP 5 returns the identifier of the VPN, $VPN_H$, and also the short number (the extension) associated to $MSISDN_A$ ($Ext_A$).

S7. The SCP 4 checks the result received from SDP 5:
  a) If $MSISDN_A$ is not associated to any VPN, SCP 4 informs MSS 2 that the call must be rejected.
  b) If $MSISDN_A$ is associated to a VPN, the SCP 4 checks then if the destination number $DestNum_B$ is a short number (extension $Ext_B$) or a standard long number.
    i. If $DestNum_B$ is a short number, $Ext_B$: The SCP 4 changes the originating number from $MSISDN_A$ to the short number $Ext_A$ and then calls again the SDP 5 to check if $Ext_B$ is defined in the VPN associated to the calling number, $VPN_H$.
    ii. If $DestNum_B$ is a long number: This is an external call. The destination number $DestNum_B$ must not be changed, but the originating number must be updated with the Main Number of the hotel VPN, $MainNum_H$. This is retrieved through a call to the SDP 5 passing the value of $VPN_H$.

S8. b) The SDP 5 processes the request:
  i. If $DestNum_B$ is a short number, $Ext_B$:
    α. If $Ext_B$ is not defined in $VPN_H$, SDP 5 informs the SCP 4 that it will reject the call (the destination short number is unknown in the hotel VPN).
    β. If $Ext_B$ is defined in $VPN_H$, SDP 5 returns to the SCP 4 the special long number associated to it, $MSISDN_B$.
  ii. If $DestNum_B$ is a long number, the SDP 5 returns the Main Number associated to $VPN_H$, $MainNum_H$.

S9. b) The SCP 4 checks the result received from SDP 5:
  i. α. If SDP 5 could not find $Ext_B$ in $VPN_H$, SCP 4 informs MSS 2 that the call must be rejected (destination not known).

β. If SDP 5 returns a long number, SCP 4 changes the original destination short number $Ext_B$ by the long number $MSISDN_B$.

ii. The SCP replaces the originating number with Main-$Num_H$.

S10. Steps S10 and S11 are optional and support the restriction of originated calls to a restricted area (e.g. the hotel premises or surroundings). Next, it the call has not been rejected, the SCP 4 may check the current location of the calling party and decide whether a call is allowed or not. This is done calling one more time to SDP 5 passing the values of $VPN_H$ and $Cell_A$.

S11. (Optional) The SDP 5 checks the cell or lists of cells associated with the $VPN_H$. These are the cells from which MO calls are allowed for the mobile stations associated to $VPN_H$.

a) If $Cell_A$ is part of this list, the SDP 5 informs the SCP 4 that it can proceed with the call.

b) If it is not, SDP 5 reports that the call must be rejected. Another option could be to allow the call but charge a higher or different rate for this call.

S12. With the result of all the previous interactions, SCP 4 returns to MSS 2 with either a reject call message or a continue with call message. In the latter case, the originating and/or destination address might have been changed.

S13. From this moment the call proceeds as defined in the standard, reaching the destination mobile station 1*b*.

Note: although in the description it has been used just one SDP 5, it can also be split in different servers/machines.

Mobile Terminated (MT) Call

For mobile terminated calls, all the calls will be originated from within the operator network. See Step 2 of MO calls: the mobile telephones used as hotel extensions have associated an $MSISDN_B$, a special long number used only internally in the operator network for signalling purposes and that does not work when dialled directly from another telephone (this is implemented in the network). When a call is originated from another extension in the hotel $VPN_H$ using number $Ext_B$ as the destination number (see Step 7.*b*.i of MO calls), the network will change it to the corresponding long number $MSISDN_B$. If it is called from outside the hotel $VPN_H$, the call will be first received at the Main number ($MainNum_H$) associated to the hotel $VPN_H$ that is part of the hotel PBX system connected to the operator mobile network. After interaction with the calling party (either through an automatic IVR system or through an operator), the PBX will know the extension $Ext_B$ that the calling party wants to talk to. At this point, the PBX will obtain either through an internal table or through interaction with SDP 5 which is the long number $MSISDN_B$ associated to $Ext_B$ and the PBX will redirect the call through the mobile operator network to $MSISDN_B$. This will be done using the standard and well known mechanisms used in PBX systems. From this point the call will proceed as a standard MT call. Note that since the hotel PBX is part of the operator network, it can use $MSISDN_B$ as a destination number (this feature is not supported from a handset).

As in MO calls, an optional step could be added to check the location of the destination party and decide whether the reception of the call should be allowed or not (e.g. allow reception of calls only when the client/MS is within or close to the premises of the hotel). In this case, $MSISDN_B$ shall have a flag in $HLR_B$ indicating that it has a Mobile Terminated IN service defined. This is passed to the $MSS_B$ when the mobile station 1*b*' is switched on, in the same way as described in Steps 1 and 2 of MO calls.

Figure 2:
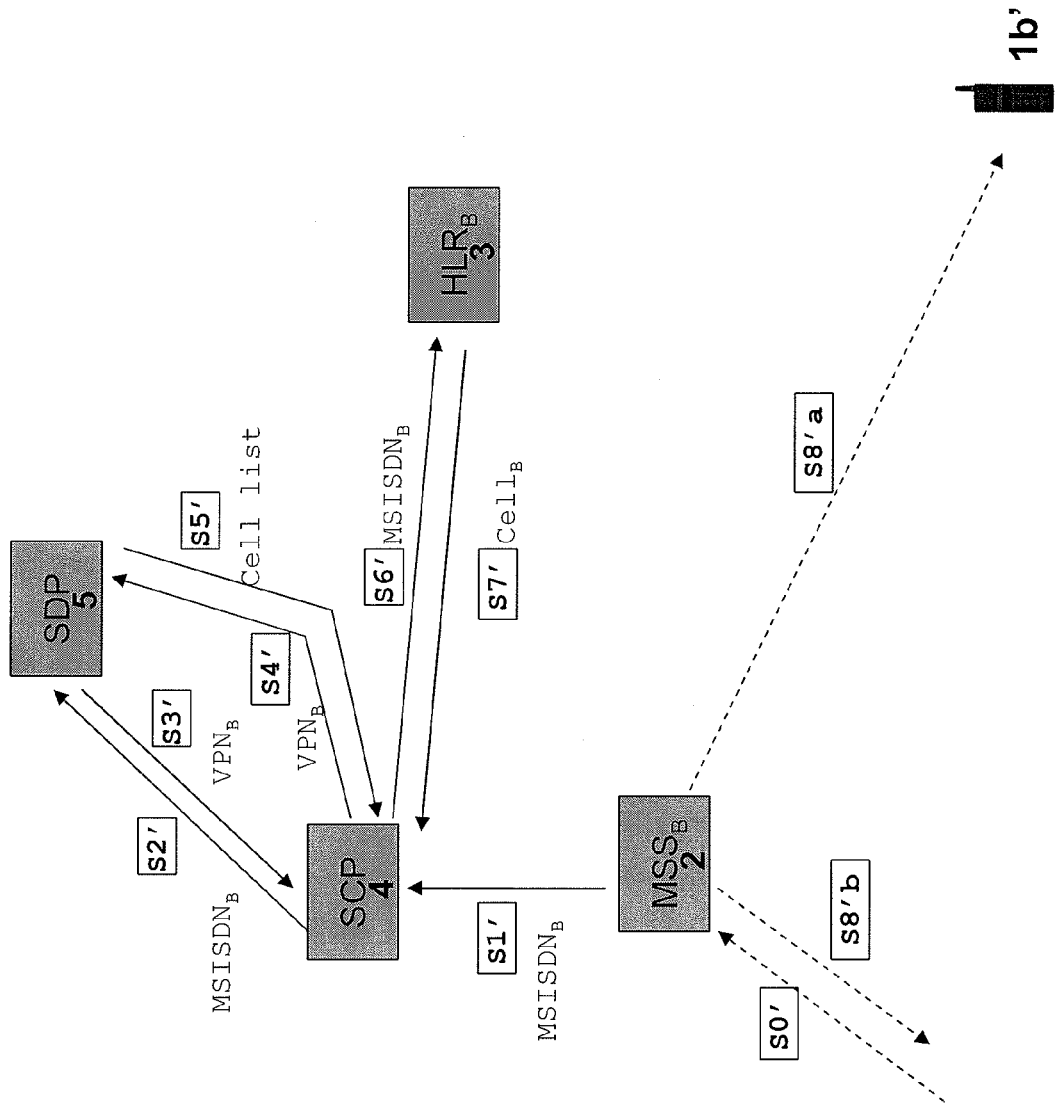
FIG. 2 shows a procedure for a mobile terminated call when the location of the called party belonging to the hotel is checked, according to a preferred embodiment.

If the location is checked, when the call arrives to $MSS_B$ the following procedure will happen, as shown in FIG. 2 (step S0' represents a Mobile Terminated Call for $MSISDN_B$ reaching the $MSS_B$):

S1'. $MSS_B$ detects a MT call for $MSISDN_B$ and sees that it has one MT IN service defined for this number, so it calls the SCP 4.

S2'. SCP 4 calls the SDP 5 to retrieve the hotel VPN that $MSISDN_B$ is associated to.

S3'. SDP 5 responds with identifier of the associated VPN, $VPN_H$ (If $MSISDN_B$ is not part of any VPN, the SDPP will inform the SCP that will then tell $MSS_B$ to reject the call)

S4'. Once the SCP has $VPN_H$, it will call again to SDP 5 to retrieve the cells/locations from which a MS associated to this $VPN_H$ can receive calls.

S5'. The SDP 5 answers back to SCP 4 with the allowed cells/locations.

S6'. SCP 4 calls the $HLR_B$ 3 to retrieve the current cell/location of $MSISDN_B$ S7'. The HLR 3 obtains the current cell/location, $Cell_B$, of $MSISDN_B$ through standard protocols and returns it to SCP.

S8'. SCP checks if the $Cell_B$ is in the list of allowed cells/locations. If this is the case, the call proceeds (S8'a) normally as a standard mobile terminated call, reaching the destination mobile station 1*b*' of the hotel. If not, the call is rejected (S8'b). In this case an SMS or a voice message can be sent to $MSISDN_B$ informing about the rejected call so that $MSISDN_B$ can start an MO call to the calling number.

What is claimed is:

1. Method for providing mobile based services for hotel PBX, the hotel PBX having an external number ($MainNum_H$) assigned, characterized in that it comprises:

providing each hotel room which provides the mobile based service with at least one mobile station (1*a*, 1*b*') comprising a SIM, each SIM storing a different IMSI number;

assigning a VPN ($VPN_H$) to the hotel;

assigning each IMSI number of each mobile station (1*a*, 1*b*') to a different MSISDN ($MSISDN_A$, $MSISDN_B$) that can only be used internally in the MNO network and that cannot be dialed from other telephones;

assigning each MSISDN ($MSISDN_A$, $MSISDN_B$) to a different extension number ($Ext_A$, $Ext_B$) that can be used as a room extension number and that corresponds to the VPN number of the VPN ($VPN_H$) of the hotel;

for each call originated from a calling mobile station (1*a*) of the hotel:

checking if the call is aimed to a called party belonging to the hotel VPN ($VPN_H$), and in that case replacing the calling party number with the extension number ($Ext_A$) assigned to the calling mobile station (1*a*);

if the call is aimed to a called party not belonging to the hotel VPN ($VPN_H$), replacing the calling party number with the external number ($MainNum_H$) of the hotel PBX;

for each mobile terminated call aimed to a called mobile station (1*b*') of the hotel:

obtaining the extension number ($Ext_B$) corresponding to the called mobile station (1*b*') of the hotel;

obtaining the MSISDN ($MSISDN_B$) associated to said extension number ($Ext_B$);

redirect the call through the mobile operator network to said MSISDN ($MSISDN_B$) of the called mobile station (1 b').

2. Method according to claim 1, characterized in that it comprises, for each call originated from a calling mobile station (1a) of the hotel, obtaining the current location (Cell$_A$) of the calling mobile station (1a) and, depending of said location, allowing or not the call.

3. Method according to claim 1, characterized in that it further comprises defining a Mobile Originated IN service associated to each MSISDN (MSISDN$_A$) assigned to the IMSI number of each mobile station (1a, 1b');

and in that it comprises, for each call originated from a calling mobile station (1a) of the hotel, the following steps:
   obtaining (S1) the IMSI number (IMSI$_A$) of the calling mobile station (1a);
   obtaining (S2) the MSISDN (MSISDN$_A$) of the calling mobile station (1a);
   obtaining (S3) the destination number (DestNum$_B$) of the call;
   checking if the MSISDN (MSISDN$_A$) of the calling mobile station (1a) has a Mobile Originated IN service, and in that case:
      checking (S5) if said MSISDN (MSISDN$_A$) belongs to a hotel VPN (VPN$_H$) and in that case:
         obtaining (S6b) the extension number (Ext$_A$) assigned to the calling mobile station (1a) and the hotel VPN (VPN$_H$);
         checking (S7b) if the destination number (DestNum$_B$) of said call belongs to the same hotel VPN (VPN$_H$), and in that case:
            replacing the calling party number (MSISDN$_A$) with the extension number (Ext$_A$) assigned to the calling mobile station (1a),
            obtaining (S8b) the MSISDN (MSISDN$_B$) associated to the destination number (DestNum$_B$),
            replacing the destination number (DestNum$_B$) with said obtained MSISDN (MSISDN$_B$), and
            if the call is allowed, establishing (S13) the call;
         in case the destination number (DestNum$_B$) corresponds to a MSISDN not belonging to the same hotel VPN (VPN$_H$):
            replacing the calling party number (MSISDN$_A$) with the external number (MainNum$_H$) of the hotel VPN (VPN$_H$), and
            if the call is allowed, establishing (S13) the call.

4. Method according to claim 1, characterized in that the extension number (Ext$_B$) corresponding to the called mobile station (1b') of the hotel is obtained by means of an automatic IVR system.

5. Method according to claim 1, characterized in that it comprises, for each mobile terminated call aimed to a called mobile station (1b') of the hotel, obtaining the current location (Cell$_B$) of the called mobile station (1b') and, depending of said location, allowing or not the reception of the call.

6. Method according to claim 5, characterized in that it further comprises defining a Mobile Terminated IN service associated to each MSISDN (MSISDN$_B$) assigned to the IMSI number of each mobile station (1a, 1b');

and in that it comprises, for each mobile terminated call aimed to a called mobile station (1b') of the hotel, the following steps:
   detecting (S1') a Mobile Terminated IN service defined for the IMSI number (IMSI$_B$) of the called mobile station (1b');
   retrieving (S3') the hotel VPN (VPN$_H$) associated to the IMSI number (IMSI$_B$) of the called mobile station (1b');
   retrieving (S5') the allowed locations from which a called mobile station (1b') associated to the hotel VPN (VPN$_H$) can receive calls;
   retrieving (S7') the current location (Cell$_B$) of the called mobile station (1b');
   checking if the current location is included in the allowed locations, and in that case allowing (S8') the reception of the call.

7. Method according to claim 1, characterized in that the obtaining, for each mobile terminated call aimed to a called mobile station (1b') of the hotel, of the MSISDN (MSISDN$_B$) associated to the extension number (Ext$_B$) corresponding to said called mobile station (1b') is carried out by any of the following means:
   consulting an internal table of the hotel PBX;
   consulting the corresponding SDP.

8. System for providing mobile based services for hotel PBX, the hotel PBX having an external number (MainNum$_H$) assigned, characterized in that it comprises:
   at least one mobile station (1a, 1b') assigned to each hotel room providing the mobile based service, each mobile station (1a, 1b') comprising a SIM storing a different IMSI number;
   a HLR (3) of the MNO providing the mobile based service for said hotel, the HLR (3) configured to:
      assign a VPN (VPN$_H$) to the hotel, each VPN number of said VPN (VPN$_H$) corresponding to an extension number (Ext$_A$, Ext$_B$) assigned to each mobile station (1a, 1b');
      assign each IMSI number of each mobile station (1a, 1b') to a different MSISDN (MSISDN$_A$, MSISDN$_B$), extension number (Ext$_A$, Ext$_B$) and to a different VPN number of the hotel;
      define a Mobile Originated IN service associated to each MSISDN (MSISDN$_A$) assigned to the IMSI number of each mobile station (1a, 1b'), the Mobile Originated IN service being configured to, for each call originated from a calling mobile station (1a) of the hotel:
         check if the call is aimed to a called party belonging to the hotel VPN (VPN$_H$), and in that case replace the calling party number with the extension number (Ext$_A$) assigned to the calling mobile station (1a);
         if the call is aimed to a called party not belonging to the hotel VPN (VPN$_H$), replace the calling party number with the external number (MainNum$_H$) of the hotel PBX;
   a hotel PBX system connected to the MNO and configured to, for each mobile terminated call aimed to a called mobile station (1b') of the hotel:
      obtain the extension number (Ext$_B$) corresponding to the called mobile station (1b') of the hotel;
      obtain the MSISDN (MSISDN$_B$) associated to said extension number (Ext$_B$);
      redirect the call through the mobile operator network to said MSISDN (MSISDN$_B$) of the called mobile station (1b').

9. System according to claim 8, characterized in that it comprises:
   at least one MSS (2) of the MNO providing the mobile based service for said hotel, the MSS (2) configured to, for each call originated from a calling mobile station (1a) of the hotel:
      obtain (S1) the IMSI number (IMSI$_A$) of the calling mobile station (1a);
      obtain (S2) the MSISDN (MSISDN$_A$) of the calling mobile station (1a);

obtain (S3) the destination number (DestNum$_B$) of the call;

check if the MSISDN (MSISDN$_A$) of the calling mobile station (1a) has a Mobile Originated IN service, and in that case send to a SCP (4) the MSISDN (MSISDN$_A$) of the calling mobile station (1a) and the destination number (DestNum$_B$) of the call;

at least one SCP (4) and at least one SDP, being configured to:

receive the MSISDN (MSISDN$_A$) of the calling mobile station (1a) and the destination number (DestNum$_B$) of the call provided by the MSS (2);

check (S5) if said MSISDN (MSISDN$_A$) belongs to a hotel VPN (VPN$_H$) and in that case:

obtain (S6b) the extension number (Ext$_A$) assigned to the calling mobile station (1a) and the hotel VPN (VPN$_H$);

check (S7b) if the destination number (DestNum$_B$) of said call belongs to the same hotel VPN (VPN$_H$), and in that case:

replace the calling party number (MSISDN$_A$) with the extension number (Ext$_A$) assigned to the calling mobile station (1a), obtain (S8b) the MSISDN (MSISDN$_B$) associated to the destination number (DestNum$_B$), replace the destination number (DestNum$_B$) with said obtained MSISDN (MSISDN$_B$);

in case the destination number (DestNum$_B$) corresponds to a MSISDN not belonging to the same hotel VPN (VPN$_H$):

replace the calling party number (MSISDN$_A$) with the external number (MainNum$_H$) of the hotel VPN (VPN$_H$).

10. System according to claim 9, characterized in that the at least one SCP (4) and at least one SDP are further configured to, for each call originated from a calling mobile station (1a) of the hotel, obtain the current location (Cell$_A$) of the calling mobile station (1a) and, depending of said location, allowing or not the call.

11. System according to claim 9, characterized in that the HLR (3) is configured to define a Mobile Terminated IN service associated to each MSISDN (MSISDN$_B$) assigned to the IMSI number of each mobile station (1a, 1b');

and in that the at least one SCP (4) and the at least one SDP are further configured to, for each mobile terminated call aimed to a called mobile station (1b') of the hotel, obtain the current location (Cell$_B$) of the called mobile station (1b') and, depending of said location, allowing or not the reception of the call.

12. System according to claim 11, characterized in that the at least one SCP (4) is further configured to, for each mobile terminated call aimed to a called mobile station (1b') of the hotel:

retrieve (S3') from the SDP (5) the hotel VPN (VPN$_H$) associated to the IMSI number (IMSI$_B$) of the called mobile station (1b');

retrieve (S5') from the SDP (5) the allowed locations from which a called mobile station (1b') associated to the hotel VPN (VPN$_H$) can receive calls;

retrieve (S7') the current location (Cell$_B$) of the called mobile station (1b');

check if the current location is included in the allowed locations, and in that case allow (S8') the reception of the call.

13. System according to claim 8, characterized in that the hotel PBX system comprises an automatic IVR system configured to, for each mobile terminated call aimed to a called mobile station (1b') of the hotel, obtain the extension number (Ext$_B$) corresponding to said called mobile station (1b').

14. System according to claim 8, having at least one hotel room which provides the mobile based service a plurality of mobile stations (1a, 1b'), characterized in that the hotel PBX system is configured such that the plurality of mobile stations (1a, 1b') sharing a room can receive incoming calls simultaneously.

15. System according to claim 8, having at least one hotel room which provides the mobile based service a plurality of mobile stations (1a, 1b'), characterized in that the hotel PBX system is configured such that one of the plurality of mobile stations (1a, 1b') sharing a room is selected as the main terminal for receiving calls and if the call is not answered by this main terminal said call is redirected to other mobile station sharing the room.

* * * * *